(12) United States Patent
Kleinschmidt et al.

(10) Patent No.: US 9,677,603 B2
(45) Date of Patent: Jun. 13, 2017

(54) EXHAUST GAS TURBOCHARGER WITH A ROTOR

(71) Applicant: Bosch Mahle Turbo Systems GmbH & Co. KG, Stuttgart (DE)

(72) Inventors: Ruediger Kleinschmidt, Besigheim (DE); Ulrich Siol, Stuttgart (DE); Alexander Baeuerle, Stuttgart (DE); Thomas Striedelmeyer, Stuttgart (DE); Joerg Eckert, Winnenden (DE); Christoph Butscher, Leonberg (DE)

(73) Assignee: Bosch Mahle Turbo Systems GmbH & Co. KG (DE)

( * ) Notice: Subject to any disclaimer, the term of this patent is extended or adjusted under 35 U.S.C. 154(b) by 77 days.

(21) Appl. No.: 14/698,396

(22) Filed: Apr. 28, 2015

(65) Prior Publication Data

US 2015/0308494 A1 Oct. 29, 2015

(30) Foreign Application Priority Data

Apr. 29, 2014 (DE) ........................ 10 2014 208 078

(51) Int. Cl.
*F16C 17/02* (2006.01)
*F01D 25/16* (2006.01)
(Continued)

(52) U.S. Cl.
CPC .............. *F16C 17/02* (2013.01); *F01D 25/16* (2013.01); *F01D 25/162* (2013.01);
(Continued)

(58) Field of Classification Search
CPC ........ F01D 25/16; F01D 25/162; F16C 17/18; F16C 2360/23; F16C 2360/24;
(Continued)

(56) References Cited

U.S. PATENT DOCUMENTS 4,371,219 A * 2/1983 Yamane ................ F01D 25/166
384/291
4,613,288 A * 9/1986 McInerney ............ F01D 17/08
384/107

(Continued)

FOREIGN PATENT DOCUMENTS

DE 3936069 A1 5/1991
DE 102008046582 A1 3/2010
(Continued)

OTHER PUBLICATIONS

English abstract for JP2009-156333, Jul. 16, 2009.
(Continued)

*Primary Examiner* — Thomas R. Hannon
(74) *Attorney, Agent, or Firm* — Fishman Stewart PLLC

(57) ABSTRACT

An exhaust gas turbocharger may include a bearing housing and a rotor. The rotor may have a shaft mounted in the bearing housing via two radial bearing bushes. Each radial bearing bush may have an inner surface facing the shaft. The inner surface may have a single chamfer, where the single chamfers of the two radial bearing bushes face one another, or two chamfers, where one of the two chamfers for each of the two radial bearing bushes facing one another are larger than the other of the two chamfers for each of the two radial bearing bushes facing away from one another.

18 Claims, 1 Drawing Sheet

(51) Int. Cl.
*F16C 33/04* (2006.01)
*F16C 35/02* (2006.01)
*F16C 35/10* (2006.01)
*F16C 17/18* (2006.01)

(52) U.S. Cl.
CPC ............ *F16C 17/022* (2013.01); *F16C 17/18* (2013.01); *F16C 33/04* (2013.01); *F16C 33/046* (2013.01); *F16C 35/02* (2013.01); *F16C 35/10* (2013.01); *F05D 2220/40* (2013.01); *F05D 2250/293* (2013.01); *F16C 2240/26* (2013.01); *F16C 2360/24* (2013.01)

(58) Field of Classification Search
CPC ........ F16C 17/02; F16C 17/022; F16C 33/04; F16C 33/046; F16C 35/02; F16C 35/10
See application file for complete search history.

(56) References Cited

U.S. PATENT DOCUMENTS

| | | | | |
|---|---|---|---|---|
| 4,640,630 A * | 2/1987 | Yoshioka | ............ | F01D 25/164 384/129 |
| 4,902,144 A * | 2/1990 | Thoren | ................ | F01D 25/166 384/287 |
| 5,207,566 A * | 5/1993 | Munkel | ................ | F01D 25/164 417/407 |
| 2010/0192571 A1* | 8/2010 | Boning | ................ | F01D 25/186 60/605.3 |
| 2013/0108483 A1* | 5/2013 | Becker | ................ | F01D 25/166 417/313 |
| 2014/0119898 A1* | 5/2014 | Nishida | ................ | F02M 55/00 415/170.1 |
| 2015/0267740 A1* | 9/2015 | Ryu | ........................ | F01D 25/16 384/103 |

FOREIGN PATENT DOCUMENTS

| | | |
|---|---|---|
| DE | 102009007696 A1 | 8/2010 |
| EP | 0057544 A1 | 8/1982 |
| EP | 2084378 A2 | 8/2009 |
| JP | 59-142426 | 9/1984 |
| JP | 2009-156333 A | 7/2009 |

OTHER PUBLICATIONS

English abstract for EP2084378, Aug. 5, 2009.
English abstract for DE102009007696, Aug. 12, 2010.
English abstract for DE102008046582, Mar. 11, 2010.
English abstract for DE3936069, May 2, 1991.

* cited by examiner

EXHAUST GAS TURBOCHARGER WITH A ROTOR

CROSS-REFERENCE TO RELATED APPLICATIONS

This application claims priority to German Patent Application No. 10 2014 208 078.9, filed Apr. 29, 2014, the contents of which are hereby incorporated by reference in their entirety.

TECHNICAL FIELD

The present invention relates to an exhaust gas turbocharger with a rotor the shaft of which is mounted in the bearing housing via two radial bearing bushes. The invention additionally relates to a radial bearing bush for such an exhaust gas turbocharger.

BACKGROUND

During the operation, exhaust gas turbochargers are exposed to rotational speeds of far in excess of 100,000 rpm. Usually, hydrodynamic bearings are used as radial bearings, either with two floating bearing bushes or a so-called single-bush mounting. An undesirable characteristic of the hydrodynamic mounting in this case is that instabilities of the rotational movement of the shaft and thus of the rotor can occur through flow effects of the oil film formed between the bearing bush and the shaft of the rotor, as a result of which in the worst case the rotor performs a stirring or wobbling movement. In order to reduce this risk it is desirable with a two-bush mounting to arrange the two radial bearing bushes axially as far apart as possible, which however in turn is only possible to a limited extent because of structural peripheral conditions of the bearing housing.

SUMMARY

The present invention deals with the problem of stating an improved or at least an alternative embodiment for an exhaust gas turbocharger of the generic type, which is characterized in particular by an improved mounting of the rotor.

According to the invention, this problem is solved through the subject of the independent claims. Advantageous embodiments are subject of the dependent claims.

The invention is based on the general idea of forming two radial bearing bushes for mounting a shaft of a rotor in a bearing housing of an exhaust gas turbocharger on its inner surface facing the shaft exclusively with a single chamfer or however with two chamfers that are different in size, wherein in the latter case the chamfers facing one another in the installed state are larger than the chamfers facing away from one another in the installed state. With the first embodiment, in which each radial bearing bush merely has a single chamfer on its inner surface facing the shaft, these face one another in the installed state. Both embodiments make possible a larger axial spacing of the two radial bearing bushes from one another, as a result of which improved mounting, in particular with respect to a susceptibility to wobbling of the rotor can be achieved. Because of the fact that the two radial bearing bushes are located further apart and have a greater axial spacing located in between, a significantly improved quietness of operation of the exhaust gas turbocharger can thus be achieved over the entire rotational speed range.

Practically, each radial bearing bush comprises at least one oil feed bore, which radially penetrates the radial bearing bush. Via such an oil feed bore, lubrication of the respective radial bearing is possible, in particular creating the oil film that is important for the mounting and required between the radial bearing bush and the shaft or the bearing housing. The oil feed bore in this case can be arranged in the centre with respect to the inner surface of the respective radial bearing bush and thus off centre with respect to the outer surface. Purely theoretically, an asymmetrical arrangement of the respective oil feed bores is thus possible.

Practically, the radial bearing bushes are each fixed in axial direction by a fixing element. Such a fixing element can for example be formed as a circlip, as radial step on the shaft of the rotor or as a thrust washer and in this case serves to limit a possible axial movement of the respective radial bearing bush. Since during the operation of the exhaust gas turbocharger the respective radial bearing bush rotates, depending on operating point, approximately with half the rotational speed of the shaft, an at least slight axial movement of the same is also possible or desirable. In order, however, to be able to always ensure the bearing function, excessive axial expansion of the respective radial bearing bush is undesirable since the oil feed bore provided in the radial bearing bush is otherwise no longer aligned with corresponding oil channels in the bearing housing, as a result of which under certain conditions the oil supply of the radial bearing can be impaired.

In a further advantageous embodiment of the solution according to the invention, a chamfer is provided on the fixing element which favours an oil discharge out of an annular gap located between the radial bearing bush and the shaft. By way of the oil feed bore, oil is delivered between the inner surface of the respective radial bearing bush and the cylindrical surface of the shaft and between the outer surface of the radial bearing bush and the bearing housing, so that in these regions a bearing lubricating oil film is created. The same exits in axial direction or is displaced in axial direction through the rotary movement of the shaft. In order to be able to reliably prevent friction movement reducing the bearing function, a chamfer is provided on the fixing element according to the invention, as a result of which the oil film exiting the annular space located in axial direction between the shaft and the radial bearing bush is transported in radial direction to the outside, specifically into an annular space between a respective end face of the radial bearing bush and the associated fixing element. In this annular space, an oil film is thus likewise created which mounts the shaft and thus the rotor of the exhaust gas turbocharger in axial direction.

The present invention is based, furthermore, on the general idea of stating a radial bearing bush according to the invention for an exhaust gas turbocharger according to any one of the preceding paragraphs, which on its inner surface facing a shaft of the exhaust gas turbocharger has a single chamfer or however two chamfers, which are different in size. Purely theoretically, the radial bearing bushes in this case can be formed as identical parts, wherein during the installation in the exhaust gas turbocharger it must always be ensured that in the case of radial bearing bushes with merely a single chamfer the same face one another in the installed state and in the case of radial bearing bushes with two different-size chamfers the respective smaller of the chamfers of the two radial bearing bushes face away from one another in the installed state. Because of this it is possible to enlarge the axial spacing between the two radial bearing bushes which otherwise identical peripheral conditions, as a result of which the shaft and thus also the rotor of the exhaust gas turbocharger has a wider support in the same installation space and because of this performs a reduced wobbling movement. Such wobbling movements must be considered particularly critically in particular with respect to the quietness of operation of the exhaust gas turbocharger.

Further important features and advantages of the invention are obtained from the subclaims, from the drawings and from the associated figure description with the help of the drawings.

It is to be understood that the features mentioned above and still to be explained in the following cannot only be used in the respective combination stated but also in other combinations or by themselves without leaving the scope of the present invention.

Preferred exemplary embodiment of the invention are shown in the drawings and are explained in more detail in the following description, wherein same reference numbers relate to same or similar or functionally same components.

BRIEF DESCRIPTION OF THE DRAWINGS

There it shows, in each case schematically.

DETAILED DESCRIPTION

Figure 1:
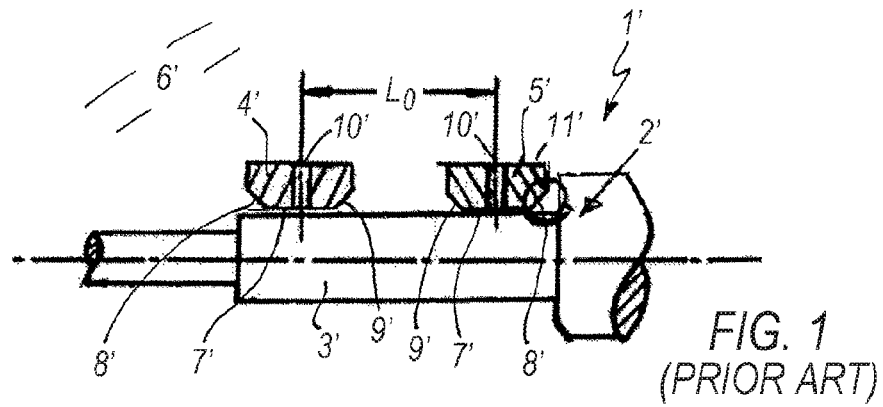
FIG. 1 an exhaust gas turbocharger with a rotor, the shaft of which is mounted in the bearing housing via two radial bearing bushes according to the prior art, FIG. 2 a representation as in FIG. 1, however with radial bearing bushes having merely a single chamfer according to the invention, FIG. 3 a representation as in FIG. 1, however with radial bearing bushes having two different size chamfers according to the invention, FIG. 4 a representation as in FIG. 2, however with an additional fixing element.

According to FIG. 1, an exhaust gas turbocharger 1' according to the prior art comprises a rotor 2', the shaft 3' of which is mounted in a bearing housing 6' via two radial bearing bushes 4' and 5'. The two radial bearing bushes 4', 5' each have two chamfers 8' and 9' on their inner surface 7' facing the shaft 3', wherein the chamfers 8', 9' are formed identical in size. This produces a central axial spacing $L_0$ of the two inner surfaces 7'.

Figure 2:
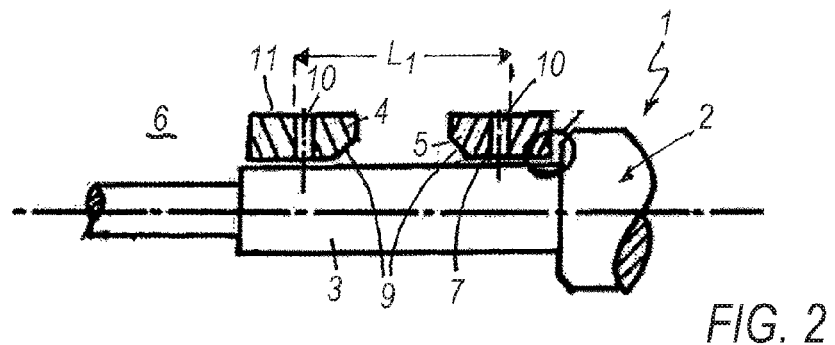
Figure 3:
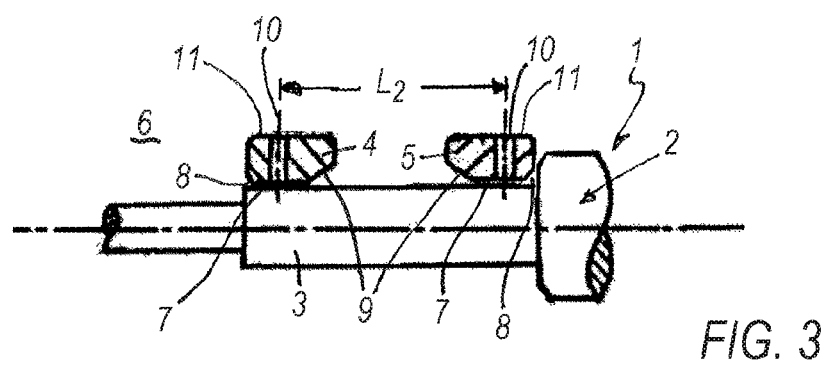
Figure 4:
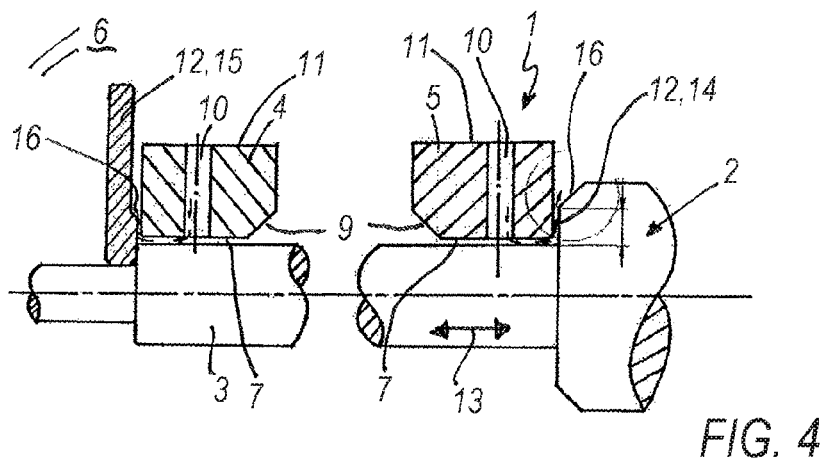

According to FIGS. 2 to 4, an exhaust gas turbocharger 1 according to the invention likewise comprises a rotor 2, the shaft 3 of which is mounted in the bearing housing 6 via two radial bearing bushes 4, 5. In contrast with FIG. 1, the reference numbers are written without apostrophe in this case. Looking at FIG. 2 it is now evident that each of the two radial bearing bushes 4, 5 according to the invention merely has a single chamfer 9 on its inner surface 7 facing the shaft 3, which face one another in the installed state. The chamfer 8' located outside which is provided according to the prior art is not provided with the radial bearing bushes 4, 5 according to FIG. 2. This produces a central axial spacing $L_1$ of the two inner surfaces 7, which is clearly larger than the axial spacing $L_0$ in the case of the exhaust gas turbocharger 1' according to the prior art, so that the rotor 2 with the exhaust gas turbocharger 1 according to the invention according to FIG. 2 has a wider mounting and because of this the risk of a wobbling movement of the rotor 2 can be reduced.

Alternatively to the embodiments of the radial bushes 4, 5 or of the exhaust gas turbocharger 1 according to the invention shown according to FIG. 2, the two radial bearing bushes 4, 5 according to FIG. 3 have two chamfers 8, 9 on their inner surface 7 facing the shaft 3, wherein the chamfers 9 facing one another in the installed state are larger than the chamfers 8 facing away from one another in the installed state. This results in a central axial spacing $L_2$ of the two inner surfaces 7 of the radial bearing bushes 4, 5 which is larger than the central axial spacing $L_0$ in the case of the exhaust gas turbocharger 1' according to the prior art, but smaller than the central axial spacing $L_1$ in the case of the exhaust gas turbocharger 1 according to the invention according to FIG. 2. The central axial spacing L in this case always relates to the axial centre line of the respective inner surface 7 of the radial bearing bush 4, 5.

Looking at FIGS. 2 to 3 it is evident that each radial bearing bush 4, 5 comprises an oil feed bore 10, which radially penetrates the radial bearing bush 4, 5 and conducts oil into an annular space located between the shaft 3 and the inner surface 7 of the respective radial bearing bush 4, 5 for establishing a lubricating film. The oil feed bore 10 in this case is preferentially arranged in the centre with respect to the inner surface 7 thus not in the centre with respect to the outer surface 11 of the respective radial bearing bush 4, 5.

Looking at the exhaust gas turbocharger 1 according to FIG. 4, it is evident that the radial bearing bush 4, 5 are each fixed by a fixing element 12 in axial direction 13. The fixing element 12 can for example be designed as a circlip, as a radial step 14 of the rotor 2 or of the shaft 3 or as a thrust washer 15. At any rate, it limits an axial freedom of movement of the respective radial bearing bush 4, 5. On the fixing element 12, a chamfer 16 can be additionally provided which favours oil discharge out of an annular gap located between the radial bearing bush 4, 5 and the shaft 3 and because of this also leads to the establishment of a bearing lubricating oil film between the fixing element 12 and the face end of the respective radial bearing bush 4, 5.

Obviously, not only the exhaust gas turbocharger 1 as a whole is to be protected with the present application but also the radial bearing bush 4, 5, which can for example be offered as replacement part.

The radial bearing bushes 4, 5 and the exhaust gas turbocharger 1 according to the invention make possible a larger central axial spacing L of the two radial bearing bushes 4, 5 and the associated inner surfaces 7, as a result of which in particular a wobbling tendency of the rotor 2 can be reduced.

The invention claimed is:

1. An exhaust gas turbocharger comprising a bearing housing and a rotor having a shaft mounted in the bearing housing via two radial bearing bushes, wherein each radial bearing bush has an inner surface facing the shaft, the inner surface having at least (i) a single chamfer, wherein the single chamfers of the two radial bearing bushes face one another, and (ii) two chamfers, wherein one of the two chamfers for each of the two radial bearing bushes facing one another are larger than the other of the two chamfers for each of the two radial bearing bushes facing away from one another.

2. The exhaust gas turbocharger according to claim 1, wherein at least one radial bearing bush is fixed in an axial direction by at least one fixing element.

3. The exhaust gas turbocharger according to claim 2, wherein the at least one fixing element is formed as at least one of a circlip, a radial step of the rotor, and a thrust washer.

4. The exhaust gas turbocharger according to claim 2, wherein the fixing element includes a chamfer favoring an oil discharge out of an annular gap located between the radial bearing bushes and the shaft.

5. The exhaust gas turbocharger according to claim 1, wherein each radial bearing bush has at least one oil feed bore, which radially penetrates the respective radial bearing bush.

6. The exhaust gas turbocharger according to claim 5, wherein the at least one oil feed bore is centered with respect to the inner surface of the respective radial bearing bush and off center with respect to an outer surface of the respective radial bearing bush.

7. The exhaust gas turbocharger according to claim 5, wherein at least one radial bearing bush is fixed in an axial direction by at least one fixing element.

8. The exhaust gas turbocharger according to claim 7, wherein the at least one fixing element includes at least one chamfer favoring an oil discharge out of an annular gap located between the radial bearing bushes and the shaft.

9. A radial bearing bush for an exhaust gas turbocharger having a rotor with a shaft, the radial bearing bush comprising an outer surface and an inner surface facing the shaft, the inner surface having one of a single chamfer or two chamfers, which are different in size.

10. The radial bearing bush according to claim 9, further comprising at least one oil feed bore penetrating the radial bearing bush from the outer surface to the inner surface.

11. The radial bearing bush according to claim 10, wherein the at least one oil feed bore is centered with respect to the inner surface and off center with respect to the outer surface.

12. An exhaust gas turbocharger comprising a bearing housing and a rotor having a shaft mounted in the bearing housing via two radial bearing bushes, wherein each radial bearing bush has an inner surface facing the shaft, each inner surface of the respective radial bearing bush having a first chamfer facing the first chamfer of the other radial bearing bush, and wherein at least one radial bearing bush is fixed in an axial direction by at least one fixing element that includes at least one chamfer favoring an oil discharge out of an annular gap located between the radial bearing bushes and the shaft.

13. The exhaust gas turbocharger according to claim 12, wherein each radial bearing bush has a second chamfer facing away from the second chamfer of the other radial bearing bush, the first chamfer being larger than the second chamfer of the respective radial bearing bush.

14. The exhaust gas turbocharger according to claim 13, wherein each radial bearing bush has at least one oil feed bore, which radially penetrates the respective radial bearing bush.

15. The exhaust gas turbocharger according to claim 14, wherein the at least one oil feed bore is centered with respect to the inner surface of the respective radial bearing bush and off center with respect to an outer surface of the respective radial bearing bush.

16. The exhaust gas turbocharger according to claim 12, wherein each radial bearing bush has at least one oil feed bore, which radially penetrates the respective radial bearing bush.

17. The exhaust gas turbocharger according to claim 16, wherein the at least one oil feed bore is centered with respect to the inner surface of the respective radial bearing bush and off center with respect to an outer surface of the respective radial bearing bush.

18. The exhaust gas turbocharger according to claim 12, wherein the fixing element is formed as at least one of a circlip, a radial step of the rotor, or a thrust washer.

* * * * *